3,728,220
NUCLEAR REACTOR FUEL PINS
Kenneth Prince, Bowdon, and Alan Charles Anthony Saunders, Hale, England, assignors to United Kingdom Atomic Energy Authority, London, England
Filed June 1, 1971, Ser. No. 148,319
Claims priority, application Great Britain, June 17, 1970, 29,450/70
Int. Cl. G21c 3/18
U.S. Cl. 176—58      3 Claims

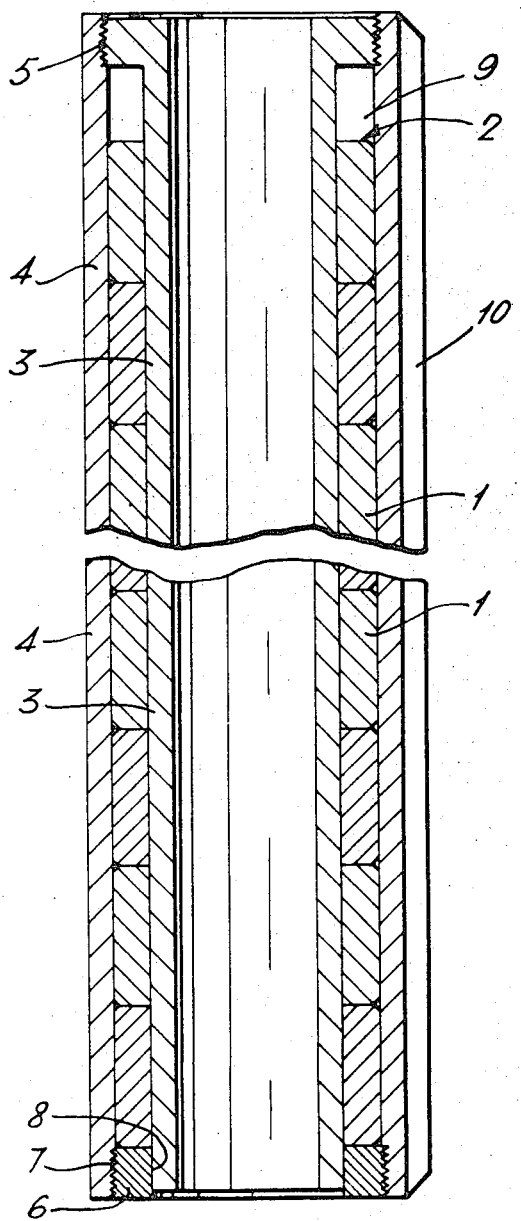

ABSTRACT OF THE DISCLOSURE

A nuclear reactor fuel pin comprises a stack of annular fuel compacts sheathed by co-axial graphite tubes. The tubes are rigidily secured at one end and the outer tube has an inwardly extending flange which slidingly embraces the inner tube. The stack of fuel compacts abuts the flange so that under irradiation which causes radial shrinkage and longitudinal growth of the compacts, both tubes are strained.

BACKGROUND OF THE INVENTION

This invention relates to nuclear reactor fuel pins for high temperature gas cooled reactors.

Fuel pins for high temperature gas cooled reactors in which the coolant is basically an inert gas such as helium, usually comprise nuclear fuel compacts having a graphite matrix, enclosed in a graphite sheath and they operate with the compacts at a temperature of approximately 1250° C. In some known fuel pins the compacts are sheathed inside and out by co-axial tubes. In order to accommodate change of shape of the compacts and differential thermal expansion of the sheath and compacts the inner sheath is usually made slidable relative to the outer sheath and between two end closures for the fuel pin.

SUMMARY OF THE INVENTION

According to the invention a nuclear reactor fuel pin for a high temperature gas cooled reactor comprises a stack of annular nuclear fuel compacts having a graphite matrix enclosed in an annular chamber bounded by two co-axial tubes which are sealably and rigidly joined together at one end to provide an end closure at that end of the chamber and are slidably joined by a flange or plug member at the other end to form a second end closure, the sliding joint being between the second end closure and the inner tube, and the stack of compacts being in abutment with the second end closure. Under irradiation in a nuclear reactor the compacts shrink radially on to the inner tube and grow longitudinally thereby imposing a longitudinal tensile stress in the inner tube, but because the stack of compacts abuts the second end closure and the tubes are joined at the other end closure, longitudinal growth of the compacts is restrained by both inner and outer tubes thus reducing the longitudinal stress and strain in the inner tube.

The invention also resides in a high temperature gas cooled nuclear reactor comprising stacks of graphite blocks having bores which define a plurality of parallel channels extending through the reactor, and a plurality of fuel pins stacked within the channels, the fuel pins being in accordance with claim 1, having tubes of graphite and being disposed in the channels with their second end closures downstream of coolant flow so that coolant permeating through the fuel tubes into the fuel chambers due to the pressure drop over the fuel pins will first have to pass through the graphite tubes. The arrangement is thus particularly suited to reactor designs in which the coolant flow is downwardly through the core.

DESCRIPTION OF THE DRAWING

A nuclear reactor fuel pin according to the invention for use in a high temperature gas cooled nuclear reactor is shown in the accompanying drawing which is a side view in section.

DESCRIPTION OF THE PREFERRED EMBODIMENTS

The fuel pin comprises a stack of fuel compacts 1 (comprising coated uranium oxide particles in a graphite matrix) enclosed in an annular chamber 2 bounded by two co-axial graphite tubes 3 and 4. The tubes are rigidly secured together at one end by a screw thread 5 sealably to close the end of the chamber. The outer tube 4 has a radially inwardly projecting flange 6 secured by a screw thread 7, the flange presenting a sliding surface 8 to the inner tube 3 and closing the other end of the chamber 2. There is provided a clearance space designated 9 to accommodate such longitudinal dimensional changes in the fuel compacts and graphite tubes as are free to occur, for example from relaxation of stresses in these components when radial interaction between the fuel compacts and the inner tube is diminished or eliminated under reactor shut down conditions. The outer tube has three equally spaced, longitudinal ribs 10 which resist bowing of the fuel pin under irradiation and also serve to locate the pin centrally within a longitudinal bore in moderating material of a reactor. Coolant flow in the reactor is through the longitudinal bore, over and through the tubular fuel pin, heat being transferred to the coolant through both the inner and outer tubes.

Under irradiation the compacts shrink radially on to the tube 4 and grow longitudinally so that, when the compacts have shrunk sufficiently to grip the inner tube, a tensile strain is induced in the tube over most of its length by further longitudinal growth (a compressive strain is induced in the region extending over the clearance space 8). The further longitudinal growth is also reacted by the other tube by reason of the abutment of the stack of compacts with the flange 6 and the rigid junction of the sealed end closure so that the strain due to growth is significantly less than in the case where compact growth is resisted only by the inner tube.

In an alternative construction the annular chamber is formed by trepanning a single bore of graphite.

The fuel pins are used in a nuclear reactor wherein the moderating material comprises prismatic blocks of graphite stacked together to form the moderator mass. The blocks have bores which co-operate to form a plurality of vertical channels and each channel houses a stack of the described fuel pins. Coolant flow (helium) is downwardly through the channels and the fuel pins are disposed each with its flange 6 lowermost.

In use, a pressure drop is created over the fuel pins but because the uppermost ends of the fuel pins are sealed any coolant entering the fuel pin will permeate through the tubes and any oxidants in the helium will react with the graphite before they reach the fuel.

We claim:

1. A nuclear reactor fuel pin for a high temperature gas cooled reactor, the fuel pin comprising two spaced co-axial tubes of graphite rigidly joined together to form a sealed closure at one end of the interspace, the outer tube having an internal flange which slidably embraces the inner tube forming a second closure at the other end of the interspace, and a stack of annular nuclear fuel compacts having a graphite matrix, the stack of compacts embracing the inner tube and in abutment with the internal flange.

2. A high temperature gas cooled nuclear reactor comprising stacks of graphite blocks having bores which define a plurality of parallel channels extending vertically through the reactor, and a plurality of fuel pins stacked within the channels, the fuel pins being in accordance with claim 1, and being disposed in the channels with their second end closures downstream of coolant flow.

3. A high temperature gas cooled nuclear reactor according to claim 2 wherein the coolant flow is downwardly through the reactor.

References Cited

UNITED STATES PATENTS

| | | | |
|---|---|---|---|
| 3,231,476 | 1/1966 | Thame | 176—83 X |
| 3,399,112 | 8/1968 | Dodd | 176—79 |
| 3,291,696 | 12/1966 | Sugimoto et al. | 176—72 X |
| 2,956,000 | 10/1960 | Kendall et al. | 176—83 |
| 3,308,033 | 4/1967 | Alfille et al. | 176—68 X |
| 3,202,583 | 8/1965 | Salesse et al. | 176—72 X |

CARL D. QUARFORTH, Primary Examiner
G. G. SOLYST, Assistant Examiner

U.S. Cl. X.R.

176—71, 79, 81